Sept. 21, 1971   J. G. P. LOMBARD ET AL   3,606,910
PRESSURE REGULATOR
Filed Sept. 26, 1969   5 Sheets-Sheet 1

Inventors
Jean G.P. Lombard
Claude T. Charcosset
By De Lio and Montgomery
Attorneys Sept. 21, 1971   J. G. P. LOMBARD ET AL   3,606,910
PRESSURE REGULATOR
Filed Sept. 26, 1969   5 Sheets-Sheet 2

Inventors
Jean G.P. Lombard
Claude T. Charcosset
By De Lio and Montgomery
Attorneys

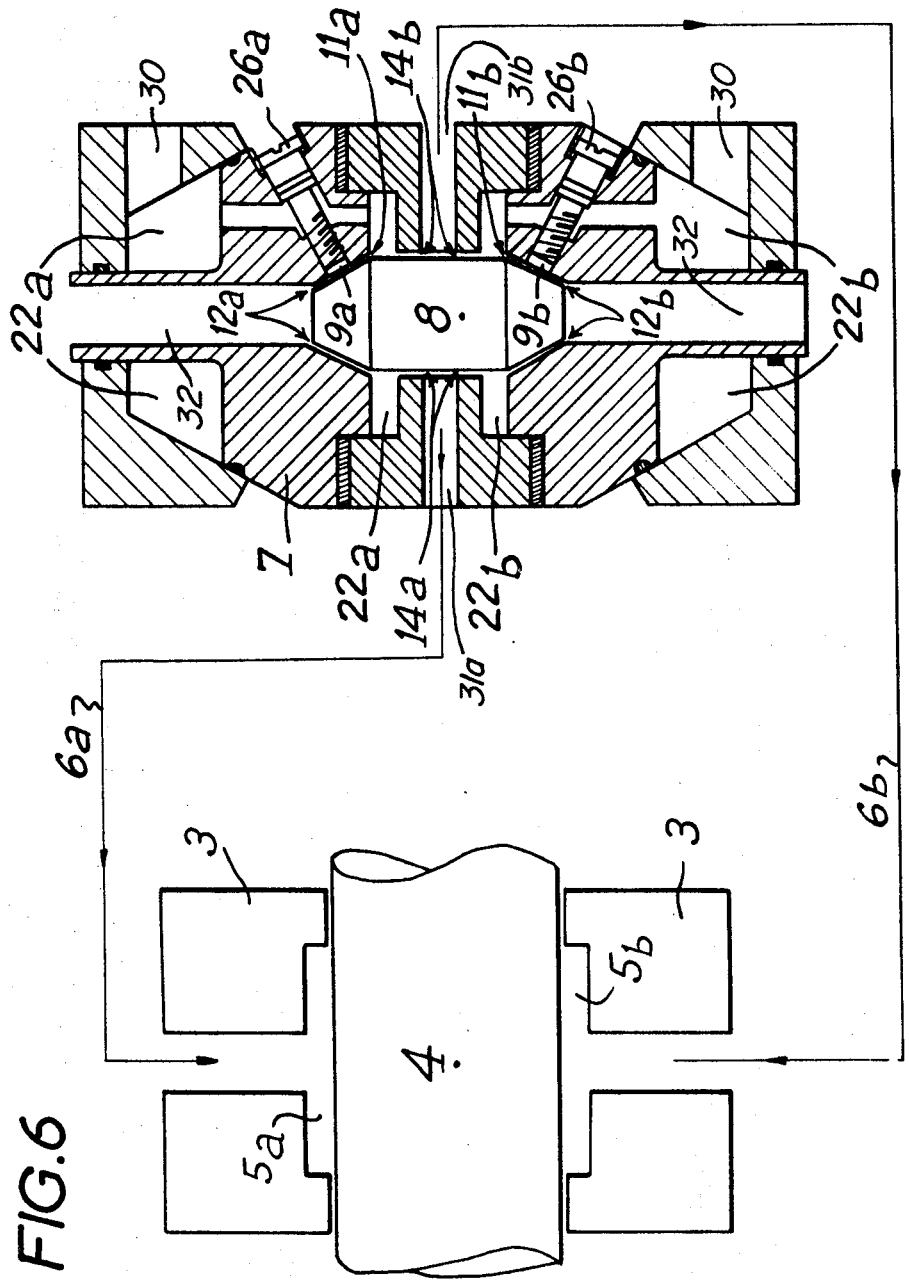

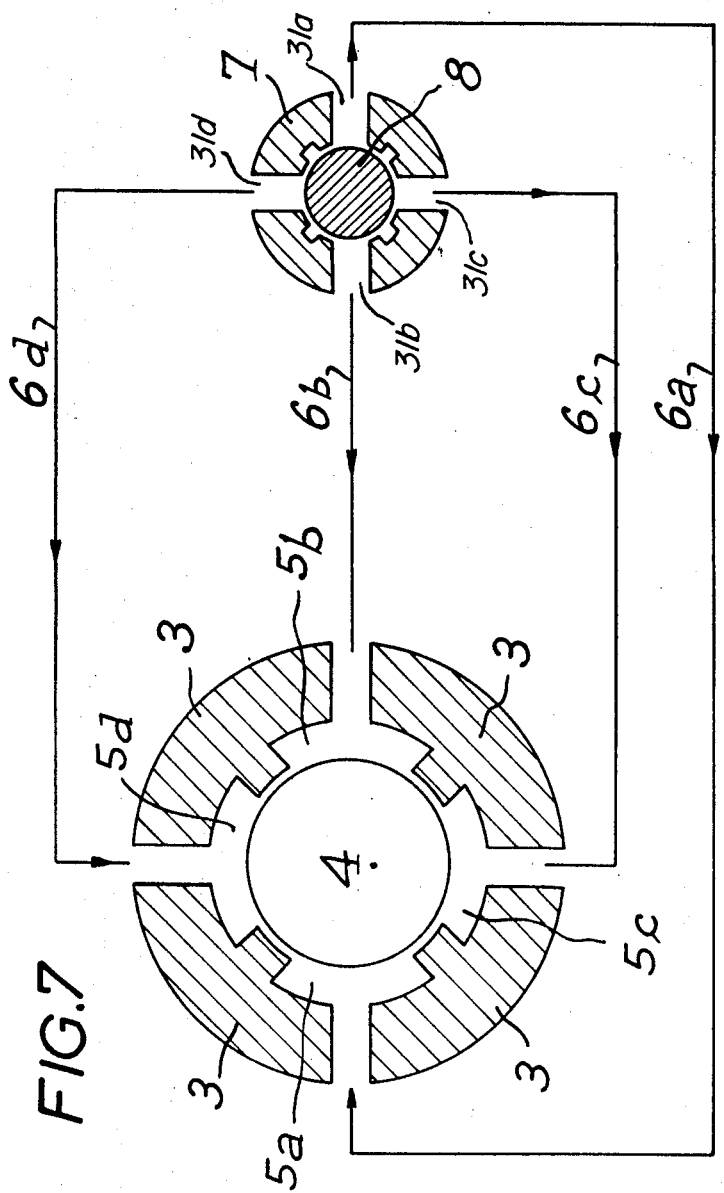

3,606,910
PRESSURE REGULATOR
Jean G. P. Lombard, Boulogne-sur-Seine, and Claude T. Charcosset, Paris, France, assignors to Centre d'Etudes et de Recherches de la Machine-Outil, Neuilly-sur-Seine, Hauts-de-Seine, France
Filed Sept. 26, 1969, Ser. No. 861,269
Claims priority, application France, Oct. 14, 1968, 169,814
Int. Cl. F16c 39/04
U.S. Cl. 137—118   14 Claims

ABSTRACT OF THE DISCLOSURE

The pressure regulator for the supply of pressurised fluid to a hydrostatic support such as a stop, slide or bearing comprises a body having an internal cavity accommodating an element capable of restricted movement. In its basic form, the regulator has an inlet communicating via a restrictor in the body with a chamber opening into the cavity adjacent the element. The restrictor may be adjustable but is fixed during operation. The chamber communicates via a variable restrictor defined between the body and the element with a chamber opening into the internal cavity adjacent the element. This chamber communicates with the atmosphere either directly or via a restrictor which may be adjustable. This arrangement acts as a hydraulic spring biasing the element towards an outlet to the hydraulic support which outlet communicates with another inlet for pressurised fluid via a variable restrictor defined between the body and the element.

---

The invention relates to pressure regulators for hydrostatic supports such as stops, slides or bearings.

Hydrostatic stops and bearings which operate in accordance with well established principles, involving the positioning in the supply circuts of fixed restrictors which produce progressively higher pressure drops as the flow rate increases, have been known for a long time.

It has been observed that where such a stop or bearing is to have high rigidity, it is necessary either to resort to large elements or to high supply pressures. Also, in order to improve rigidity it has been found necessary to resort to variable restrictors in the supply system.

Whatever the application, these devices use a movable element and elastic return elements which balance the pressure forces acting upon the movable element and tend to increase the flow area.

However, it is equally well known that, although these devices enable the rigidity of the stop or bearing to be improved, they do not fix the position of the moving part.

This stems from the fact that the elastic elements employed in the regulator generally, at the small travels involved, have a linear force-travel characteristic whilst the characteristic of the hydraulic spring, constituted by the stop for example, is non-linear.

According to the invention, there is provided a pressure regulator for a hydrostatic support, the regulator comprising a body having an internal cavity accommodating an element capable of restricted movement, an inlet for pressurised fluid communicating via a variable restrictor defined between the body and the element with an outlet connectable to a hydrostatic support, the variable restrictor being controlled by a hydrostatic spring biasing the element towards the outlet, the hydrostatic spring comprising an inlet for pressurised fluid communicating via a restrictor in the body with a chamber opening into the cavity adjacent the element, the chamber communicating via a variable restrictor defined between the body and the element with a chamber in communication with the atmosphere.

The ensuing description given by way of example, will provide a better understanding of the invention and of the secondary features and their advantages, which appear in the course of the said description. The description of the drawings has been given purely by way of non-limitative examples.

FIG. 6 is a section through a regulator for a hydrostatic bearing, and through the bearing concerned; and FIG. 7 schematically unites the sections through regulator and bearing given in FIG. 6, in planes perpendicular to the respective axes of these elements.

In the various figures, similar parts are denoted by the same reference numerals.

Figure 1:
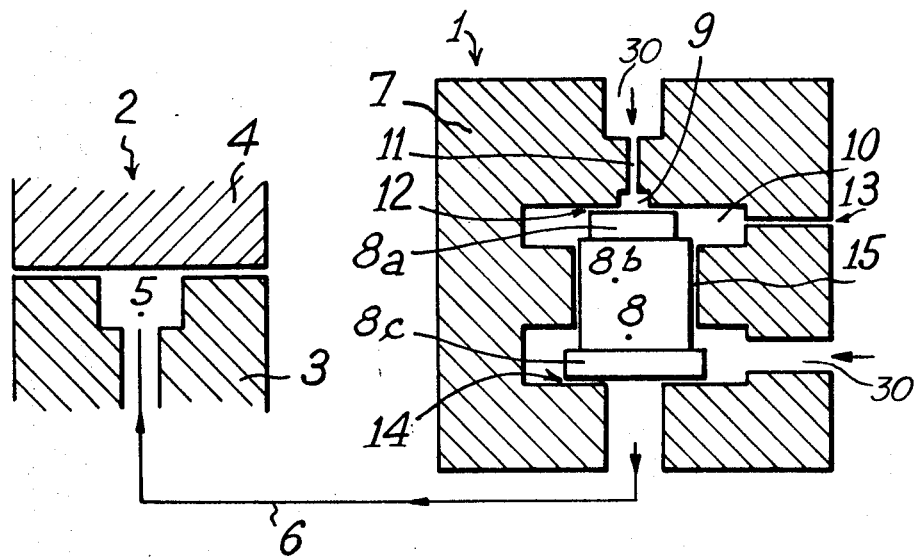
FIG. 1 is a schematic section through a regulator and through the single stop which it controls.

In FIG. 1, two devices can be seen, namely a regulator 1 and a stop 2. The term "stop" refers to a structure in which one member limits movement in a given direction of another member. Similarly, the term "double stop" refers to a structure in which the displacement of a first member is limited in opposite directions. The stop 2 is constituted by a fixed portion 3 connected to the frame of a machine (not shown) upon which the stop is mounted, and a movable component 4. The mutually opposite surfaces of the components 3 and 4 have the same profile and a chamber 5 can be supplied with pressurised fluid through the fixed portion 3 via a line 6.

The regulator 1 is constituted by a body 7 inside which an element 8 which has a very limited displacement is guided. In the example chosen, this element consists of three coaxial cylinders 8a, 8b and 8c. It will be observed that, in addition, a chamber 9 is formed between the body 7 and the top face of the cylinder 8a, and that a chamber 10 is formed between the element 8 and the body 7. The chamber 9 is connected to a pressurised fluid supply source (not shown) through a fixed restrictor 11, and to the chamber 10 through a variable restrictor 12 constituted by the space defined between the top face of the cylinder 8a and the opposite face of the body 7. This chamber 10 leads to the atmosphere through a fixed restrictor 13. Throughout the drawings, the ports or inlets connected to the fluid pressure source are identified by the reference numeral 30.

The supply of pressurised fluid is also connected to the stop delivery, i.e. to the line 6, via a variable restrictor 14 constituted by the bottom face of the cylinder located opposite the corresponding part of the body 7. It will be observed that another restrictor 15 is constituted by the space defined between the bore of the body 7 corresponding to the cylinder 8b, and the cylinder 8b itself. The restrictor 15 and the fluid pressure therein serves to maintain element 8 coaxial with the cavity defined in body 7.

In operation of the device of FIG. 1 assuming the presence of a supply of pressurized fluid, element 8 is in an equilibrium condition under the effect of the pressure of the fluid in chamber 5 transmitted through line 6 and under the effect of the restoring forces of the hydrostatic bias constituted by the fluid in chamber 9. Quite obviously the kind of adjustments which are displaced and relevant to this construction are much more numerous than in the case of an element returned by a simple spring. In the present construction, the diameters of the cylinders 8a, 8b and 8c can be selected in relation to each other such that the restrictors 11 and 13 can also be selected as required, and the ratios between the restrictors 12 and 14 can also be appropriately selected. In the case of a metal return spring the only parameters which can be altered are the rigidity and the fitted load of the spring. The fact that the return characteristic in the present case is non-linear is a favorable factor. Experience fully confirms the superiority of this regulator since a very high stop rigidity is obtained within a wide range of variation of load. Otherwise stated, whether the stop is highly loaded or not the component 4 displaces very little in relation to the fixed component 3.

Figure 2:
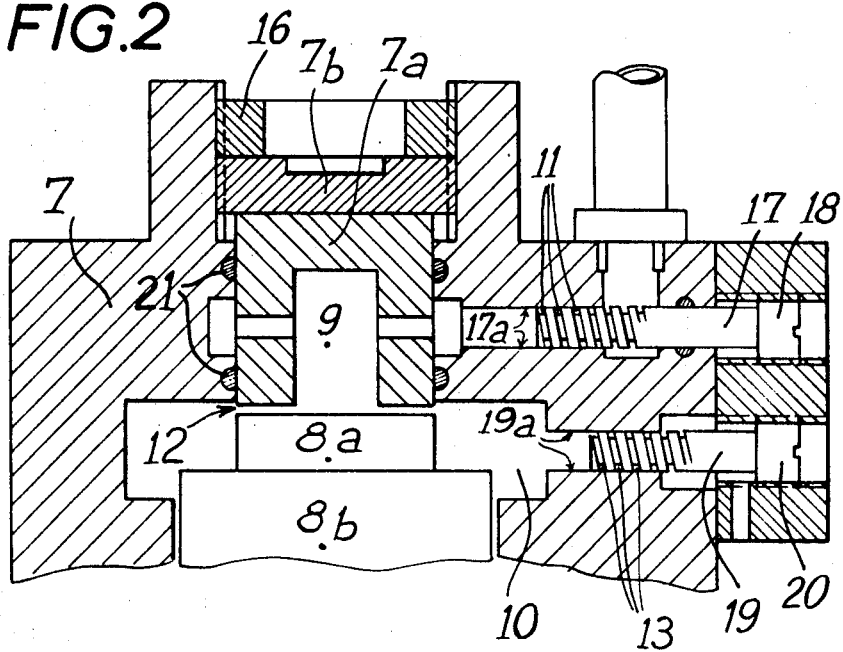
FIG. 2 is a section through the regulator for a single stop.

FIG. 2 illustrates, in partial section, an embodiment of a regulator of the kind described above. Particular attention should be paid to the details of the upper part of the regulator, which includes a solid element 7a having a part 7b screwthreadedly engaged in the body 7 and locked thereby a locknut 16. Two seals 21 ensure that the arrangement is fluidtight. In addition, the restrictor 11 is constituted by a screw 17, the crests of the threads sliding in a bore 17a drilled in the body 7, and the screw being held in position, for example, by screwing its head portion 18 into the body 7. Similarly, the restrictor 13 is constituted by a screw 19 having a head 20, the crests of the threads of the screw 19 sliding in a bore 19a.

In the embodiment of FIG. 2 the advancing of the element 7a into the body 7 regulates the ratio between the restrictors 12 and 14, and the screws 17 and 19 regulate the value of restrictors 11 and 13 (as referred to FIG. 1). These adjustments may be effected externally, requiring no dismantling or modification to the regulator, as would be the case of a regulator which employed a mechanical return spring. While the restrictors 11 and 13 may be varied and predetermined, in operation they are maintained at a constant setting.

In operation, the element 8 is in equilibrium under the action of the pressure acting on the bottom thereof from chamber 5 communicated through the conduit 6, and on the other hand by the action of the forces of the pressures which prevails in chamber 9. If the pressure in line 6 increases, there will be a tendency for element 8 to move upwardly and decrease the restriction 12. Consequently the pressure in the chamber 9 tends to increase as it is a function of the value of the restriction 12 and also the restriction 11 placed on the supply. This tends to counterbalance the increase in pressure and hence the force urging element 8 upwardly. Equilibrium is therefore established.

The displacement of the element 8 is always caused by the variation of the pressures in the lead feeding the stop or the bearing. The resultant instantaneous unbalance of forces caused by this displacement modifies the various restrictors of the regulator. It is this reaction of the regulating element to the change in restrictors which is analogous to the energy stored or released by a spring upon the change in tension thereof, and why this device may be considered to include a "hydrostatic spring."

Figure 3:
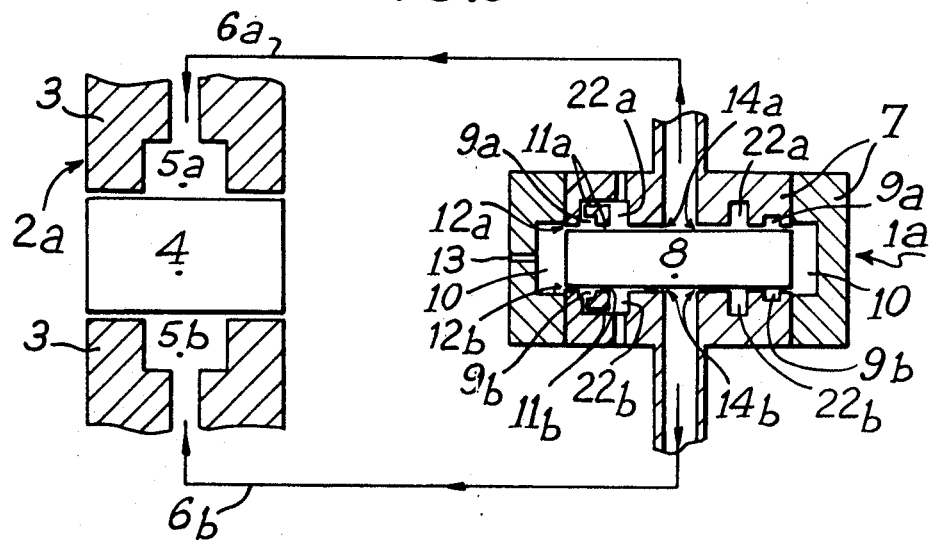
FIG. 3 is a schematic section through a regulator for a double stop.

FIG. 3 is a schematic view of a regulator of a double stop, and of the corresponding stop itself. Since the stop has to be supplied by different routes, in the simplest case a symmetrical regulator is used in which most of the elements hereinbefore referred to recur; however, the element 8 is of a different design. It will be seen that chambers 5a and 5b of a stop 2a are supplied, via lines 6a and 6b, from a regulator 1a.

The regulator 1a is constituted by a body 7 inside which a cylindrical element 8 can execute small movements. The body 7 comprises chambers 9a, 9b and 10 which are annular in form, and the supply of pressurised fluid is effected through annular chambers 22a and 22b located at either side of the element 8. The body 7, the element 8, the chamber 10 and the restrictor 13 constitute the common elements to the two separate supply arrangements which leave the regulator 1a.

Restrictors 11a and 11b are each constituted by a fixed restrictor bore in the body 7 and a variable restrictor space defined between the element 8 and body 7.

Each annular chamber 9a or 9b may be substituted by chambers spaced around one side of the element 8.

In the embodiment of FIG. 3 the restrictor between the body member and the element together with the chambers 9a and 9b act to provide biasing forces which may be referred to as hydraulic springs. In the device of FIG. 3 if the pressure in either of lines 6a or 6b should increase there will be a tendency in the regulator for the element 8 to move as a result thereof. Such movement will produce an unbalance of resultant forces on one side of the element 8, resulting in increase in pressure which will move element 8 back to a position of equilibrium. The chamber 10 can be bled either across the restrictor 13 or by any other means. It has been observed that when the load applied to the moving component 4 is below a given value, and provided chamber 10 opens directly to atmosphere (restrictor 13 offering no resistance) the area of the chambers 9a and 9b presented to the element 8 are in a given ratio with those of the orifices leading to the stop, restrictions 11a and 11b being correctly adjusted, the component 4 remains absolutely stationary in relation to the component 3.

Figure 4:
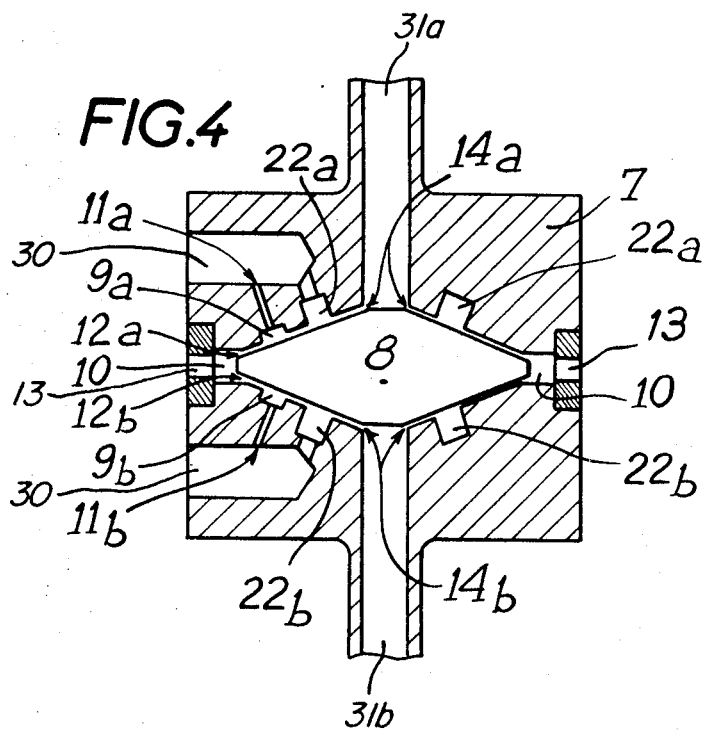
FIG. 4 is a section through a first variant embodiment of the regulator for a double stop.
Figure 5:
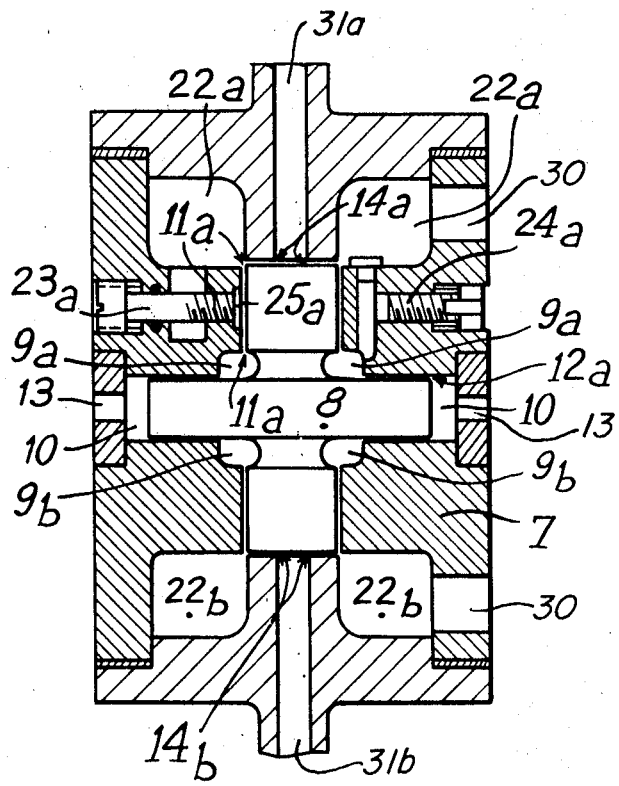
FIG. 5 is a section through a second variant embodiment of the regulator for a double stop.

FIGS. 4 and 5 illustrate variant embodiments of the regulator schematically indicated in FIG. 3. In the two embodiments, the element 8 is a solid of revolution, being of double-coned form in the first embodiment and double-cylinder form in the second embodiment.

The regulator 1a of FIG. 4 comprises a body member 7 defining a cavity 10 receiving therein an annular double cone shaped element 8 which can have limited displacement substantially in the vertical direction. Further defined in body 7 is a plurality of chambers 9a and 9b in open communication with the cavity 10 adjacent the element 8. The chambers 9a and 9b may be distributed over and in the walls defining the chamber 10.

The supply of pressurized fluid (not shown) is applied to chamber 10 through inlets 30 and chambers 22a and 22b located on opposite sides of element 8. The body member 7, element 8 and chamber 10 comprise common elements to the two separate supply arrangements which supply fluid under pressure through conduits 31a and 31b.

The restrictors 11a and 11b each comprise a fixed restriction in the body 7 and a variable restrictor defined by the space between element 8 and body 7.

The operation of the device of FIG. 4 is the same as that described for the device of FIG. 3. The particular double conical shape of the element 8 in the regulator shown in FIG. 4 produces automatic centering of the element 8 in the body 7. Any displacement of the mass perpendicular to the vertical axis thereof, results in a restoring force directed towards such axis.

In FIG. 5, the element 8 consists of three coaxial cylinders, two smaller-diameter ones being located at either end of a third cylinder. Moreover, it will be observed that means are provided in order to regulate the restrictors, these means being of the kind already described in relation to the regulator for the single stop (FIG. 2); they are constituted by screws 23a and 24a in the upper part, which are provided in groups of three. Similar screws are provided in the lower part, but these are not visible since the section has been taken in a plane which does not contain them. The screws 23a are located in the passage supplying chamber 9a. Through the screws 23a, three chambers 25a are supplied which extend over an angular interval of slightly less than 120°. The screws 24a are located in the passage connecting chamber 9a to the reservoir or to atmosphere. It will be appreciated, also, that the smaller-diameter cylinders can have a slight taper.

The operation of the device of FIG. 5 is similar to that of FIG. 4. When the regulator of FIG. 5 is once in equilibrium, the chambers 25a insure that the element 8 remains centered in the body 7, and further regulate the quantity of fluid supplied to the chambers 9a and 9b. The upper screws 24a and the corresponding lower screws (not shown) make it possible to bleed part of the fluid from the chambers 9a and 9b directly. Centering of the element 8 could equally well be effected by providing a slight taper to the upper and lower smaller diameter cylinders. This would allow chambers 25a to be dispensed with.

The screw adjustment of the restrictors through the use of the screws 23a and 24a provides a very efficient manner of predetermining the degree of restriction merely by driving the screw forward or backing it off and thereby changing the length of the restriction. In the arrangement of FIG. 5 fluid pressure is supplied to the regulator through the openings 30 from the source and is applied to the load through the passages 31a and 31b.

In the regulators of FIGS. 4 and 5, the chambers 10 are merged with passages leading to the atmosphere.

The preceding description applies equally to the case of hydrostatic bearings. FIGS. 6 and 7 illustrate a hydrostatic bearing with four supporting chambers 5a, 5b, 5c and 5d. The element 8 is a solid of revolution and has a central cylindrical portion flanked at either end by frusto-conical portions. Three chambers 9a are located in the body 7 opposite the top frusto-conical portion of the element 8, the chambers being spaced at intervals of 120° from one another. The chambers 9a are designed to be supplied with pressurised fluid through restrictors 11a which are fixed during operation but which can be regulated as required and take the form of the threads of screws 26a.

Again, the same major elements as defined earlier, are to be found here. The distinction in this case is that the chamber 10 of the double stop (FIG. 3) is now constituted by the passage which leads to the atmosphere. The number of chambers 5a, 5b . . . and the number of restrictors 14a, 14b, . . . must be identical, but, on the other hand, the number of chambers 9b can be arbitrarily chosen or at any rate does not have to be in any compulsory ratio to that of the chambers 5a, 5b. . . . Similarly, the number of chambers 5a, 5b, . . . has been chosen as four by way of example only.

In addition, it goes without saying that in the case of the multiple supporting zones of stops, bearings and slides, although it is without doubt an advantage to employ regulators which are adapted to each particular case, several examples having been described already, the simple regulator described in FIGS. 1 and 2 operates perfectly satisfactorily in all instances: it is merely necessary to provide as many of them as there are zones of support to be fed.

The regulator of FIGS. 6 and 7 if applied to a bearing for a rotatable shaft operates in the same manner as the devices of FIGS. 1–5. The cylindrical portion of the element 8 acts as an orifice with respect to the head orifices 31a, 31b, 31c and 31d through which the chambers 5a to 5b are supplied. The frusto-conical portions of the element 8 cooperate with the chambers 9a and 9b both to suspend the element 8 with respect to walls defining the internal cavity of body member 7 and to act as hydraulic biasing means or springs.

The regulator of FIGS. 6 and 7, for a hydrostatic bearing, operates in the same fashion as the foregoing regulators. The cylindrical portion of the element 8 thus acts as an obturator in respect of the head orifices through which the chambers 5a to 5b are supplied. As far as the frusto-conical portions are concerned, these co-operate with the chambers 9a and 9b in order both to suspend the element 8 and to do duty as hydraulic springs. The chambers 9a, 9b are adjustable by means of the screws 26a and 26b. It will be observed that the number of chambers of the bearing is not limited and it may, in particular, be set at two; the regulator of FIG. 6 is thus entirely suitable for use with a double stop.

It will be observed that in a general way the fluid of which mention has been made thus far, may be either incompressible or compressible and is preferably oil.

In addition, it will be observed that in the case where the restrictors 13 are not provided, the chambers 10 are placed in direct communication with the atmosphere. Since the supply pressure to the regulator is generally constant, and the pressure in the chamber 10 is therefore also constant, the fluid flow along the movable element 8 develops under a pressure system which is independent of the position of the movable element.

The great advantage of the arrangement employed is that it enables the movable element to be maintained in position within the body of the regulator whilst leaving substantial clearances so that very little friction occurs in operation.

It will be seen, furthermore, that the supply flow rate to the regulator is in no way related to that of the main support, stop, bearing or slide etc., and this is an advantage which arises substantially out of the basic design of the regulators.

Operation is closely linked with the fact that the communication between the two chambers 9 and 10 of a group, constitute a restrictor located in a passage between the body and the element. This arrangement leads to adjustment in opposite directions of this restrictor and the one supplying the main support, for example the stop.

Finally, it should be emphasised that the operations of the main arrangements of the regulator in accordance with the invention, combine to produce the overall function. It will be appreciated, particularly, that it is necessary to have a substantially constant supply to the first chambers of the regulator and to thus provide a volume of fluid the pressure of which can develop, in all circumstances, to a level which will counterbalance that of the fluid supplying the main support.

The invention is in no way limited to the embodiments which have just been described, rather, it covers all the possible variations which could be made to it without departing from its scope. In particular, it is sometimes advantageous to equip the regulator either with friction-dampers and/or viscous dampers, or with fixed dynamic dampers, acting for example on the element 8. In order to reduce friction, it is also expedient to cause the element 8 to rotate about its own axis.

We claim:

1. A pressure regulator for a hydrostatic support, comprising a body member having walls defining an internal cavity, an inlet and an outlet for pressurized fluid defined in said body with said outlet being connectable to an element disposed within said cavity and having limited movement therein, said body member and said element defining a variable restriction between said inlet and outlet openings; the improvement of hydrostatic biasing means for urging the element toward the outlet comprising a chamber defined in said body in communication with said cavity adjacent the element, a second inlet including a restrictor in the body providing a passage for fluid pressure to said chamber, another opening into said body member from the ambient atmosphere, said chamber communicating with said another opening through a variable restriction defined between said body member and said element.

2. The pressure regulator as claimed in claim 1 in which a further chamber is defined in the body member communicating with said another opening and another restrictor is carried by the body member between said chamber and said another chamber.

3. The pressure regulator as claimed in claim 1 in which the said another restrictor carried in the body is adjustable from outside the body.

4. In a pressure regulator for a hydrostatic support, comprising a body member having walls defining an internal cavity, an element disposed within the cavity and having limited movement between spaced apart walls defining the cavity, first and second inlet passages for directing pressurized fluid into said cavity on opposite sides of said element, first and second outlet passages in the body on opposite sides of said element connectable to a hydrostatic support, said element and said walls defining variable restrictions between said inlet and said outlet passages, the improvement comprising hydrostatic biasing means for controlling the variable restrictions, each biasing means acting on said body in opposite directions and including a chamber defined in said body in communication with the cavity adjacent the element, another inlet passage defined through said body member to said cavity, the chamber communicating through a variable restriction defined between the body and the element to the ambient atmosphere.

5. A pressure regulator as claimed in claim 4 in which the said another inlets each communicate with one of the first and second inlets.

6. A pressure regulator as claimed in claim 4 further including another chamber common to both of said hydrostatic biasing means, said another chamber serving to provide communication to the ambient atmosphere.

7. A pressure regulator as claimed in claim 4 further including another chamber defined in said body member adjacent the element and a further restrictor carried in the body providing communication between said another chamber and the ambient atmosphere.

8. A pressure regulator as claimed in claim 4 further including restrictors carried in said body between said chambers and said another inlets, said restrictors being adjustable from outside said body member.

9. A pressure regulator as claimed in claim 4 in which the element is of double cylinder form and consists of two equal diameter cylinders rigid with and located at either side of a third cylinder of larger diameter, each variable restriction communicating with the chamber in communication with the atmosphere being defined between the body and the periphery of the third cylinder.

10. A pressure regulator as claimed in claim 4 in which the element is a solid of revolution comprising two frusto-conical parts on opposite sides of a cylindrical part, each variable restrictor communicating with the chamber in communication with the atmosphere being defined in one of the frusto-conical surfaces and the body.

11. A pressure regulator as claimed in claim 10 comprising two chambers in communication with the atmosphere which are respectively adjacent the two frusto-conical surfaces and are centered on the axis of the element.

12. A pressure regulator as claimed in claim 10 in which the variable restrictions communicating with the said outlets are defined between the cylindrical part of the element and the body member.

13. A pressure regulator as claimed in claim 10 in which the said chamber opening into the cavity adjacent the element is an annular chamber surrounding the frusto-conical part on either side of the element.

14. A pressure regulator as claimed in claim 4 in which the element is substantially of double-coned form on either side thereof and a chamber is defined between the periphery thereof and the body member, and said chamber is in communication with the atmosphere.

References Cited

UNITED STATES PATENTS

| | | | |
|---|---|---|---|
| 3,251,633 | 5/1966 | Mohsin | 308—9X |
| 3,442,560 | 5/1969 | De Gast | 308—9X |
| 3,457,942 | 7/1969 | Johnson | 137—118 |

ROBERT G. NILSON, Primary Examiner

U.S. Cl. X.R.

137—509; 308—9